United States Patent [19]

Ota et al.

[11] Patent Number: 5,199,587
[45] Date of Patent: Apr. 6, 1993

[54] BIAXIAL-ORIENTATION BLOW-MOLDED BOTTLE-SHAPED CONTAINER WITH AXIAL RIBS

[75] Inventors: Akiho Ota; Hiroaki Sugiura; Hiroichi Ishii, all of Tokyo, Japan

[73] Assignee: Yoshino Kogyosho Co., Ltd., Tokyo, Japan

[21] Appl. No.: 892,669

[22] Filed: Jun. 4, 1992

Related U.S. Application Data

[63] Continuation of Ser. No. 821,909, Jan. 15, 1992, abandoned, which is a continuation of Ser. No. 693,012, Apr. 29, 1991, abandoned, which is a continuation of Ser. No. 169,168, Mar. 10, 1988, abandoned, which is a continuation of Ser. No. 836,109, Mar. 4, 1986, abandoned.

[30] Foreign Application Priority Data

Apr. 17, 1985 [JP] Japan ................. 60-57180[U]
Oct. 4, 1985 [JP] Japan ................. 60-152099[U]
Oct. 4, 1985 [JP] Japan ................. 60-152100[U]

[51] Int. Cl.⁵ ............................................. B65D 23/00
[52] U.S. Cl. ............................. 215/1 C; 220/94 A; 220/771; 220/755
[58] Field of Search ........................ 215/1 C, 100 A; 220/99 A; D9/530, 535, 541, 543, 545, 556, 557, 563, 570

[56] References Cited

U.S. PATENT DOCUMENTS

| | | | |
|---|---|---|---|
| D. 190,528 | 6/1961 | Brandeis | D9/406 |
| D. 203,076 | 11/1965 | Adell | D9/398 |
| D. 203,883 | 2/1966 | Wood | D9/411 |
| D. 207,509 | 4/1967 | Thomka et al. . | |
| D. 210,571 | 3/1968 | Vanderhyde | D9/404 X |
| D. 214,550 | 7/1969 | Plummer | D9/408 |
| D. 256,992 | 9/1980 | Kretz . | |
| D. 258,117 | 2/1981 | Bashour | D9/403 |
| D. 262,267 | 12/1981 | Cox | D9/383 |
| D. 277,551 | 2/1985 | Kerr . | |
| D. 279,167 | 6/1985 | Haney et al. . | |
| D. 281,577 | 12/1985 | Larson et al. | D9/367 |
| D. 281,862 | 12/1985 | Bertrand | D9/385 |
| D. 282,349 | 1/1986 | Larson et al. | D9/367 X |
| D. 286,000 | 10/1986 | Bussell | D9/398 X |
| D. 292,378 | 10/1987 | Brandt et al. . | |
| 1,602,391 | 10/1926 | Creaver . | |
| 1,636,174 | 7/1927 | Dolan et al. . | |
| 2,022,520 | 11/1935 | Philbrick . | |
| 3,152,710 | 10/1964 | Platte | 215/1 C |
| 3,232,495 | 2/1966 | Schneider . | |
| 3,403,804 | 10/1968 | Colombo | 215/1 C |
| 3,536,500 | 10/1970 | Cleereman et al. | 215/1 C |
| 3,537,498 | 11/1970 | Amand . | |
| 3,708,082 | 1/1973 | Platte . | |
| 4,308,955 | 1/1982 | Schieser et al. . | |
| 4,372,455 | 2/1983 | Cochran . | |
| 4,387,816 | 6/1983 | Weckman . | |
| 4,609,106 | 9/1986 | Gentili | 215/1 C X |
| 4,993,565 | 2/1991 | Ota et al. | 215/1 C |

FOREIGN PATENT DOCUMENTS

| | | |
|---|---|---|
| 1304883 | 3/1982 | Australia . |
| 570010 | 3/1988 | Australia . |
| 571000 | 3/1988 | Australia . |
| 714017 | 9/1968 | Belgium . |
| 0055595 | 7/1982 | European Pat. Off. . |
| 934609 | 5/1948 | France . |
| 1337902 | 8/1962 | France ................. 215/100 A |
| 1507327 | 12/1967 | France ................. 215/1 C |
| 2443915 | 12/1979 | France . |
| 0033745 | 8/1981 | France . |
| 614859 | 12/1948 | United Kingdom . |
| 856958 | 12/1960 | United Kingdom . |
| 1024406 | 3/1966 | United Kingdom . |
| 1024763 | 4/1966 | United Kingdom . |
| 1059930 | 2/1967 | United Kingdom . |
| 1207017 | 9/1970 | United Kingdom . |
| 2066766 | 7/1981 | United Kingdom . |

Primary Examiner—Bryon P. Gehman
Attorney, Agent, or Firm—Oliff & Berridge

[57] ABSTRACT

A blow-molded bottle-shaped container of biaxially oriented synthetic resin integrally molded with a neck at the top of a cylindrical body thereof, comprising a pair of recesses depressed inwardly on the cylindrical wall thereof at both sides of the cylindrical body and spaced so that one remaining container body surface of the container body forms a grip by the formation of said recesses. The blow-molded bottle-shaped container of biaxially oriented synthetic resin can enhance sufficiently the mechanical strength of the recesses formed on the container body by providing reinforcing ribs for effectively dispersing internal pressure acting one the recesses.

14 Claims, 5 Drawing Sheets

FIG.1
FIG.2
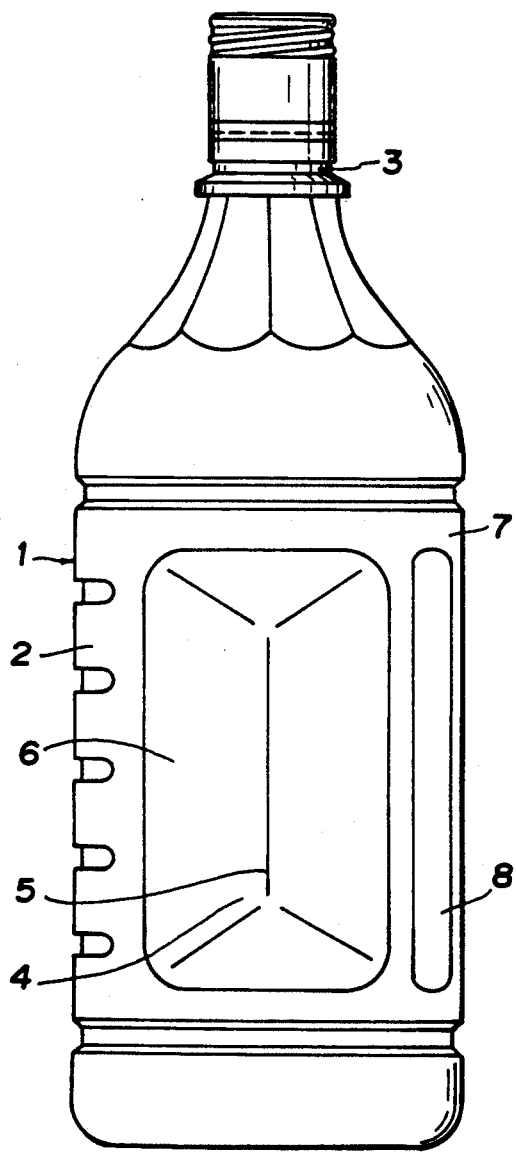
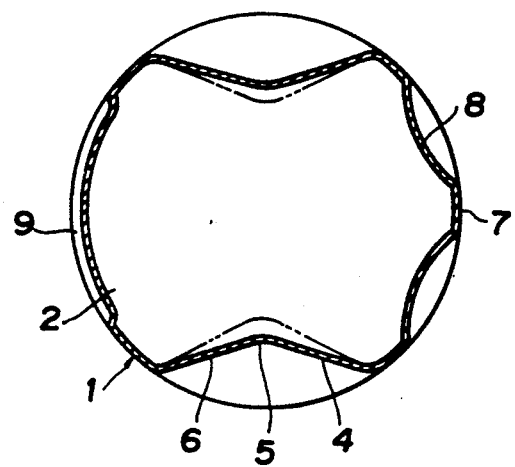

FIG. 3
FIG. 4
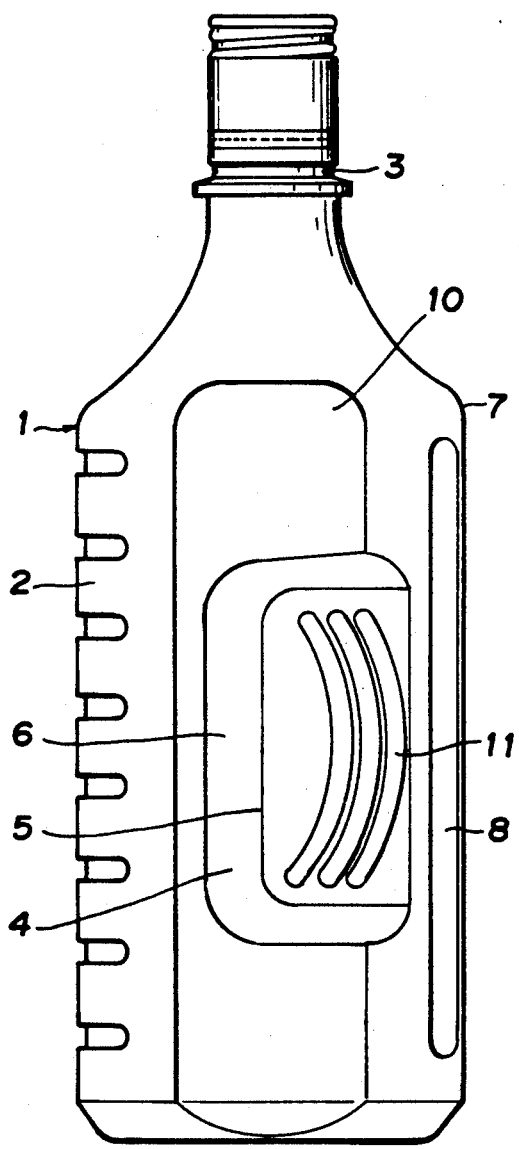
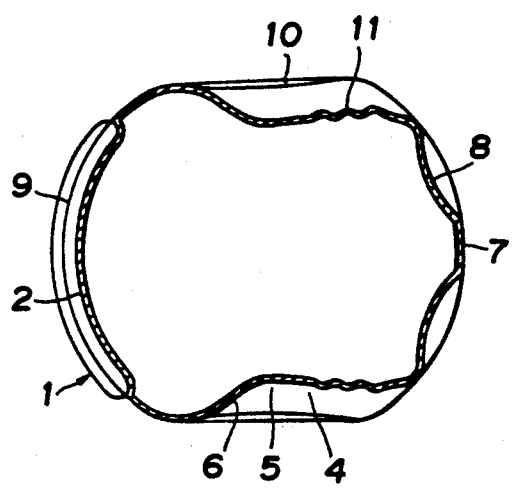

5,199,587

BIAXIAL-ORIENTATION BLOW-MOLDED BOTTLE-SHAPED CONTAINER WITH AXIAL RIBS

This is a continuation of application Ser. No. 07/821,909 filed Jan. 15, 1992, now abandoned, which in turn is a continuation of application Ser. No. 07/693,012 filed Apr. 29, 1991, now abandoned, which in turn is a continuation of application Ser. No. 07/169,168 filed Mar. 10, 1988, now abandoned, which in turn is a continuation of application Ser. No. 06/836,109 filed Mar. 4, 1986, now abandoned.

BACKGROUND OF THE INVENTION

This invention relates to a blow-molded bottle-shaped container of biaxially oriented synthetic resin such as polyethylene terephthalate resin.

Recently, bottle-shaped containers of relatively large size for containing liquids such as, for example, liquors or soy sauces have been widely utilized.

The most effective means for molding a bottle-shaped container of this type include means for molding the bottle-shaped container by biaxial orientation blow-molding a preformed piece molded from a synthetic resin material. Particularly, a blow-molded bottle-shaped container of biaxially oriented polyethylene terephthalate resin has a number of advantages such as light weight, excellent mechanical strength and physical properties, and inexpensive cost, together with the possibility of mass production.

Since the blow-molded bottle-shaped container of biaxially oriented synthetic resin of this type has a round configuration as a whole with a smooth surface and is molded in a relatively large size, the bottle-shaped container may tend to slip when held by hand, and is accordingly inconvenient to be grasped by the hand, and must be associated with a grip separately molded as a holding means of the container body.

In order to obviate this difficulty of holding the conventional bottle-shaped container, axially slender recesses have been manufactured at both sides of a cylindrical body of the bottle-shaped container so as to utilize the rear halves of the container body as a grip.

The abovementioned conventional bottle-shaped container is certainly convenient to handle the container body by hand, but does not always have sufficient mechanical strength. More specifically, the conventional bottle-shaped container of this type exhibits a serious drawback that, when the conventional bottle-shaped container is dropped in the state that a predetermined quantity of liquid is filled in the container body to conduct a strength test, the slender recesses formed on the body of the bottle-shaped container are externally projected and deformed by the internal pressure of the liquid contained in the container body by the dropping impact, resulting in no recovery of the deformation.

Further, this external projecting deformation of the recesses on the body of the conventional bottle-shaped container means insufficient buckling strength of the recesses formed on the container body, and this bottle-shaped container is desired to provide high mechanical strength.

SUMMARY OF THE INVENTION

Accordingly, it is an object of this invention to provide a blow-molded bottle-shaped container of biaxially oriented synthetic resin which can eliminate the drawbacks and inconvenience of the conventional bottle-shaped container described above and can enhance sufficiently the mechanical strength of the recesses formed on the container body by providing reinforcing ribs for effectively dispersing internal pressure acting on the recesses.

The foregoing object and other objects as well as the characteristic features of the invention will become more fully apparent and more readily understandable by the following description and the appended claims when read in conjunction with the accompanying drawings.

BRIEF DESCRIPTION OF THE DRAWINGS

FIG. 1 is a side view of a first embodiment of a blow-molded bottle-shaped container of biaxially oriented polyethylene terephthalate resin according to this invention;

FIG. 2 is a sectional view taken along the line II—II in FIG. 1;

FIG. 3 is a side view of a second embodiment of a blow-molded bottle-shaped container according to this invention;

FIG. 4 is a sectional view taken along the line IV—IV in FIG. 3;

DESCRIPTION OF THE PREFERRED EMBODIMENTS

Figure 5:
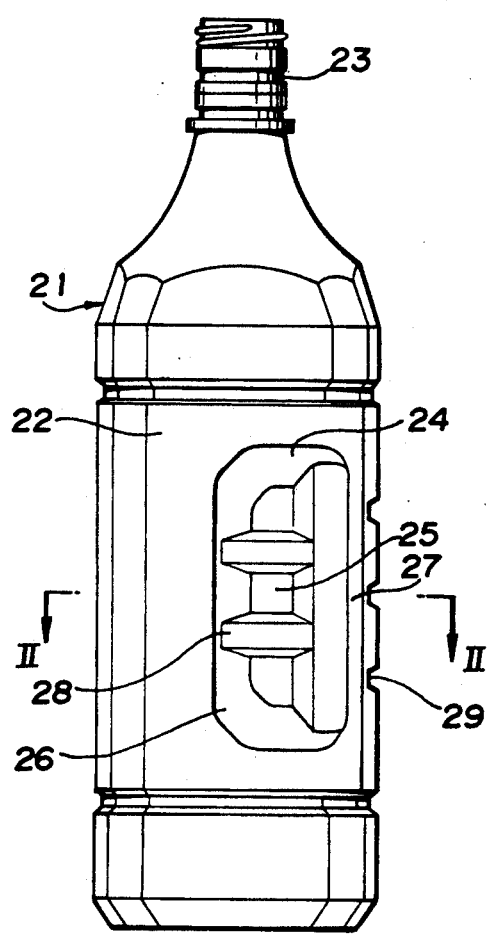
FIG. 5 is a side view of a third embodiment of a blow-molded bottle-shaped container according to the invention.

FIGS. 1 and 2 show a first embodiment of a blow-molded bottle-shaped container of biaxially oriented polyethylene terephthalate resin according to this invention. A bottle-shaped container 1 is integrally molded with a neck 3 at the top of a cylindrical container body 2 by means of biaxial-orientation blow molding. The cylindrical container body 2 is formed with recesses 4 of trough shape depressed radially inwardly at opposite sides thereof between the vicinity of the bottom and the vicinity of the shoulder of the container body, and recesses 4 are formed by taper walls 6 tapered toward the deepest edges 5, 5 thereof. In this configuration of the cylindrical container body 2, one side of the body 2 between the recesses 4 forms a grip 7, in which axial reinforcing ribs 8 of groove shape are formed. Further, a plurality of lateral grooves 9 are aligned axially at a predetermined interval in parallel on the other cylindrical body portion opposite to the grip 7 to reinforce the container body 2.

FIGS. 3 and 4 show a second embodiment of a blow-molded bottle-shaped container according to this invention. The cylindrical container body 2 of a bottle-shaped container 1 is molded with substantially smooth flat surface portions 10 at opposite sides thereof between the bottom and the shoulder of the container body 2 in such a manner that the lateral cross sectional shape of the container body 2 is formed substantially in a rectangular shape. Recesses 4 are respectively formed in the container body 2 at the opposite sides thereof. A plurality of anti-slip strips 11 are formed in parallel at a predetermined interval in the recesses 4, 4. In the second embodiment, reinforcing ribs 8 of axial groove shape are formed in the grip 7, and a plurality of lateral grooves 9 are aligned axially at a predetermined interval in parallel on the body other cylindrical portion opposite to the grip 7 in the same manner as the first embodiment.

As apparent from the above description, in the bottle-shaped container of the embodiments described above, negative pressure in the container body 2 acting on the cylindrical wall of the body 2 is absorbed by the recesses 4. Accordingly, the container body 2 is not deformed. Further, the container body 2 can be readily grasped by hand due to the configuration described above and the grip is not deformed by the grasping force by means of the reinforcing ribs 8.

Figure 6:
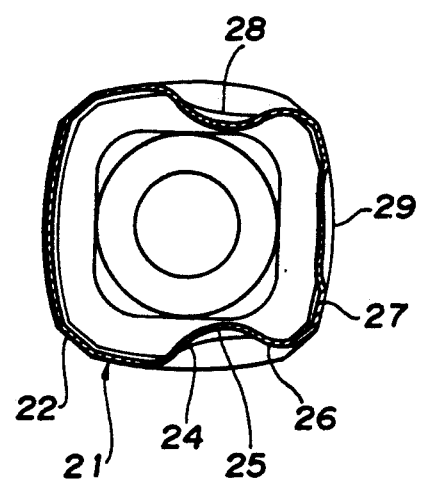
FIG. 6 is a sectional view taken along the line VI—VI in FIG. 5.

FIGS. 5 and 6 show a third embodiment of a bottle-shaped container according to the invention. A bottle-shaped container 21 has a cylindrical container body 22 in which the lateral cross sectional shape thereof is formed substantially in a rectangular shape, and a neck 23 is integrally molded through a shoulder at the top of the container body 22.

Recesses 24 formed on opposite cylindrical surface portions of the container body 22 are respectively depressed inwardly toward a deepest body surface portion 25 at the center thereof via inclined taper walls 26 of the periphery thereof.

A pair of the recesses 24 are formed as described above on the opposite cylindrical surface portions to thereby cause the rear parts of the container body 22 to become a grip 27 of an axial strip shape. Further, a plurality of lateral grooves 29 are formed at a predetermined interval in parallel on the rear peripheral wall of the grip 27. The lateral grooves 29 thus formed provide mechanical strength of the grip 27, i.e., sufficient resistance strength against the grasping force of a hand acting on the grip 27 so as not to deform the grip 27.

Further, one or more reinforcing ribs 28 of projecting strip shape are respectively formed laterally in the recesses 24 to cross the recesses 24 in such a manner that the ribs 28 are projected from the peripheral walls 26 of the recesses 24.

In the third embodiment described above, two reinforcing ribs 28 reinforce the recesses 24 having long elevational height. The number of the reinforcing ribs 28 in the recesses 24 may be selected depending upon the degree of reinforcement needed in recesses 24. In the particular third embodiment, two reinforcing ribs 28 are spaced at an interval that a finger of the hand can be inserted, thereby performing the anti-slip effect by the reinforcing ribs 28.

It is noted that the projecting state of the reinforcing rib 28 may be any of linear and externally swelling states and that both ends of the reinforcing ribs 28 may be disposed in the vicinity of the depression starting portion of the recesses 24 from the tapered wall 26 so as to increase the projecting height as much as possible. However, even in the case that the ribs 28 are externally swelled, it is noted that the position of the projecting end must not be a value projected from the plane shape of the cylindrical body surface of the entire container body 22, i.e., a value larger than the depth of the recesses 24. Ideally, the projecting height of the rib 28 may be preferably set to a value equal to or near the depressed depth of the recesses 24.

According to the embodiment described above, the reinforcing ribs 28 are projected to be molded to cross the recesses 24 in a projecting strip shape in a relatively high projecting width. Therefore, sufficiently high mechanical strength can be provided in the recesses 24. Thus, even if internal or external pressure is acted on the recesses 24, the recesses 24 are not externally transferred, bent, projected nor deformed by the internal pressure, and the recesses 24 may not be further depressed nor deformed by the external pressure.

Therefore, even if the bottle-shaped container constructed as described above is dropped in the state that a content liquid is filled to raise the impact internal pressure in the container body or to effect a large internal pressure on the recesses, or even if a strong external pressure is acted on the recesses when the grip is grasped by hand in the state that the content of liquid in the container is heavy, the reinforcing ribs resist against the internal and external pressure acting on the recesses. Therefore, the recesses of the bottle-shaped container are not bent, projected nor deformed toward the outside or inside, and the machanical strength of the entire bottle-shaped container can be largely enhanced, and since the grip is integrally molded with the container body, a relatively large-sized bottle-shaped container body can be readily handled.

Figure 7:
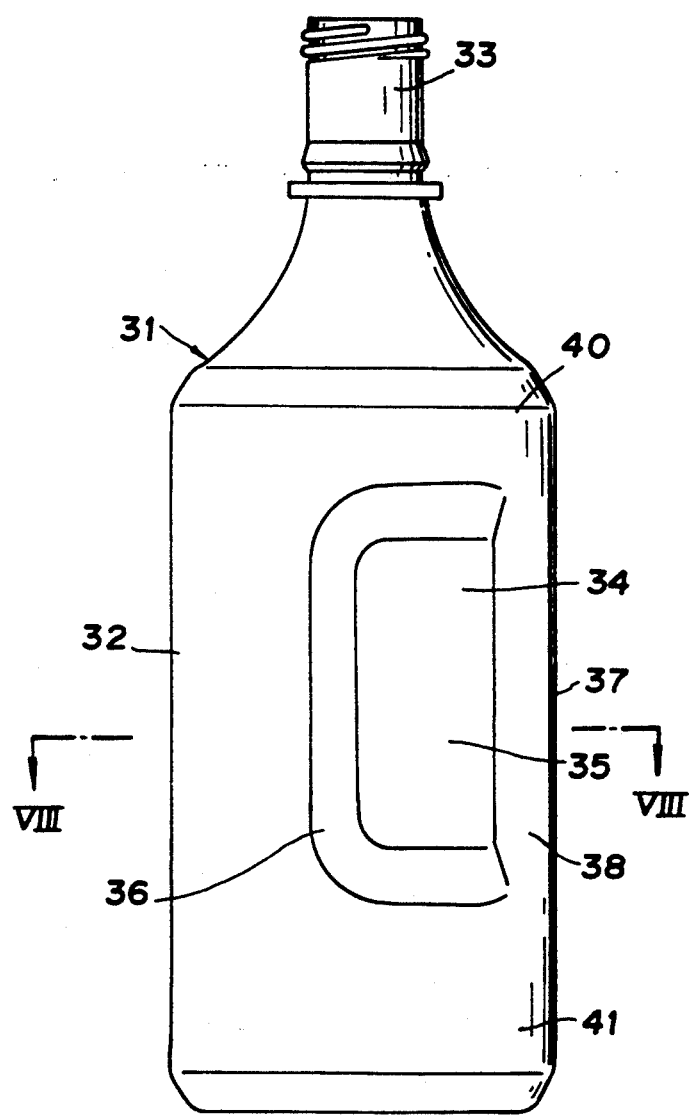
FIG. 7 is a side view of a fourth embodiment of a blow-molded bottle-shaped container according to the invention.
Figure 8:
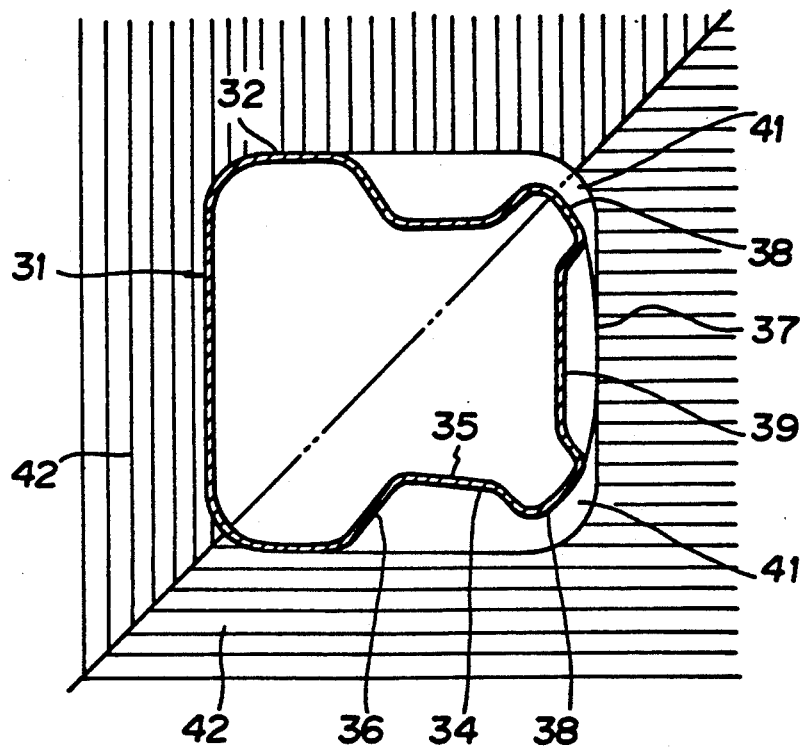
FIG. 8 is a sectional view taken along the line VIII—VIII in FIG. 7.

FIGS. 7 and 8 show a fourth embodiment of a bottle-shaped container of the invention. A bottle-shaped container is fabricated by filling a preformed piece in a molding cavity formed in a pair of molds and biaxial-orientation blow-molding the preformed piece. Therefore, when the recesses are formed at the center of the container body, the clamping or separating direction of the molds is in a direction perpendicularly crossing the side of the bottle-shaped container body having a rectangular lateral cross sectional shape thus molded. Thus, a parting line formed on the molded bottle-shaped container is formed from the front surface and the back surface of the bottle-shaped container to the bottom.

However, in the bottle-shaped container of this type, indication of the contents of the container must be put on any of the positions on the surface of the bottle-shaped container so that the position is always on the front surface of the bottle-shaped container to be particularly noticeable. The indicating means normally include a label printed as required and bonded on the bottle-shaped container, or printed directly on the container body surface. In this case as described above, the parting line is formed on the front surface of the bottle-shaped container. Thus, it has such drawbacks that, when the label is bonded, a wrinkle might be formed or the printing might not be effectively achieved. Further, according to the configuration of this bottle-shaped container, it is impossible to provide the reinforcing rib grooves on the back surface of the grip due to the separating direction of the mold, and thus the mechanical strength of the grip remains insufficient.

Then, it is considered to form the parting line along the edge line of the bottle-shaped container having a rectangular lateral cross sectional shape so as to eliminate a problem to bond the label, but if a pair of opposite recesses are formed at the center of the body of the bottle-shaped container and the grip remains to be formed on the rear half, the upper and lower portions of the rear half of the container body are externally projected from the grip, and, when the molded bottle-shaped container is removed from the blowing mold, the grip is engaged therewith with the effect that the bottle-shaped container cannot be conveniently removed from the molds.

The difficulty of separating the molded bottle-shaped container from the molds further increases if the reinforcing rib grooves are formed on part of the grip as described above.

In the fourth embodiment described above, a parting line is formed along the edge line of a bottle-shaped container having a rectangular cross sectional shape so as to eliminate the abovementioned difficulty. Thus, the molded container is reliably separated from the mold, and the mechanical strength of the grip integrally molded with the bottle-shaped container is attained.

A bottle-shaped container 31 of this embodiment has a pair of recesses 34 depressed inwardly on a cylindrical container body surface at both sides of the container body 32 having a rectangular cross sectional shape in the same manner as the previous embodiments, and a grip 37 formed at the rear half of the container body 32. The recesses 34 are formed by taper walls 36 depressed slowly toward a deepest body surface portion 35 at the center thereof.

At least one side end of the grip 37 is formed with an oblique surface 38 having an inclining angle of a right angle as the maximum value with respect to an imaginary diagonal line of the container body surface of the container body 32. With this configuration, an upper portion 40 and a lower portion 41 of the rear half of the container body 32 are externally projected.

Further, a plurality of reinforcing ribs 39 are formed in lateral groove shape on the rear wall of the grip 37 to attain the mechanical strength of the grip 37, and the ribs 39 have inclined surfaces 38 having inclining angles maximized at a right angle with respect to the diagonal line on the other side end wall.

In the configuration of the fourth embodiment, the reinforcing ribs 39 are laterally formed on the rear walls of the grip 37. Thus, the grip 37 may not be deformed by the grasping force of a hand so as to sufficiently resist against the grasping force of the hand. Then, at least one side end of the grip 37 formed on the rear half of the container body 32 has an inclined surface 38 having inclining angles maximized at a right angle with respect to the imaginary diagonal line of the flat shape of the container body 32. Thus, the opposing surface of a blowing mold for molding the bottle-shaped container is disposed on the diagonal line, and the clamping or separating direction of the mold 42 is directed in a direction perpendicularly crossing the diagonal line in the flat surface of the container body 32 so that the grip 37 may not be engaged when the molded bottle-shaped container is separated from the mold.

Further, the reinforcing rib groove 39 of the rear wall of the grip 37 has an inclining angle of the other side end wall oppositely facing to one side end portion of the grip 37 at the diagonal line. Thus, when the molded bottle-shaped container is separated from the mold, the molded container is not engaged with the reinforcing rib groove 39.

Further, since the operating direction of the mold 42 when parting is directed as described above, the parting line of the mold is formed along the edge of the container body having a rectangular cross sectional shape. Thus, the label can be bonded on the front surface of the container body or can be printed directly on the front surface reliably and simply.

What is claimed is:

1. A blow-molded bottle-shaped container of biaxially oriented synthetic resin integrally molded with a neck at the top of a cylindrical body thereof, comprising:
   a pair of recesses depressed inwardly on the cylindrical wall thereof at opposing sides of the cylindrical body,
   a grip comprising a first cylindrical body portion between said recesses, and
   a second cylindrical body portion opposite to said grip,
   wherein only two axial reinforcing ribs are formed in the grip, each reinforcing rib being located adjacent a corresponding one of said recesses and depressed inwardly and concavely, and
   wherein a plurality of lateral reinforcing grooves are aligned at a predetermined interval on the second cylindrical body portion opposite to said grip.

2. A blow-molded, bottle-shaped container having a longitudinal axis formed of biaxially oriented synthetic resin, comprising:
   a neck section,
   a body section having a circumference defining a substantially circular perimeter of said container, said body section consisting of a first body portion and an adjacent second body portion, said first body portion defining a grip,
   a shoulder section tapering between said neck section and said body section, and
   a bottom section,
   said first body portion defining said grip having first and second opposed recesses indented from said circumference and being separated by a central grip portion, said central grip portion having first and second longitudinally extending axial reinforcing ribs substantially adjacent to said first and second recesses, respectively, said first and second reinforcing ribs extending inward from said circumference.

3. The blow-molded, bottle-shaped container recited in claim 2, wherein each of said first and second recesses comprises four substantially flat portions, each flat portion extending from said circumference to a common recessed edge.

4. The blow-molded, bottle-shaped container recited in claim 2, wherein said first and second axial reinforcing ribs are separated by an arcuate section extending in said circumference.

5. The blow-molded, bottle-shaped container recited in claim 2, wherein said first and second recesses each have a plurality of axial anti-slip strips.

6. The blow-molded, bottle-shaped container recited in claim 2, wherein said first and second recesses are diametrically opposed mirror images of each other.

7. The blow-molded, bottle-shaped container recited in claim 2, wherein said first portion comprises more than two-thirds of the surface area of said body section.

8. A blow-molded, bottle-shaped container recited in claim 2, wherein said second body portion consists substantially of a plurality of lateral grooves separated by sections of said second body portion extending in said circumference.

9. The blow-molded, bottle-shaped container recited in claim 2, further comprising a horizontal rib between said neck section and said body section.

10. The blow-molded, bottle-shaped container recited in claim 2, further comprising a horizontal rib between said body section and said bottom section.

11. The blow-molded, bottle-shaped container recited in claim 2, wherein axial lengths of said first and second recesses and of said first and second axial reinforcing ribs are all approximately equal.

12. The blow-molded, bottle-shaped container recited in claim 2, wherein said first recess is separated from said first axial reinforcing rib by a section of said first body portion extending in said circumference.

13. The blow-molded, bottle-shaped container recited in claim 2, wherein said first and second recesses are separated from said first and second axial reinforcing ribs respectively by sections of said first body portion extending in said circumference.

14. A blow-molded, bottle-shaped container formed of biaxially oriented synthetic resin and having a longitudinal axis, comprising:
 a neck section;
 a body section having a circumference defining a substantially circular perimeter of said container, said body section consisting of a first body portion and an adjacent second body portion, said first body portion defining a grip;
 a shoulder section tapering between said neck section and said body section; and
 a bottom section,
 said first body portion defining said grip having first and second opposed recesses indented from said circumference and being separated by a central grip portion, said central grip portion consisting of first and second longitudinally extending axial reinforcing ribs and an arcuate section therebetween, said reinforcing ribs being substantially adjacent to said first and second recesses, respectively, said first and second reinforcing ribs extending inward from said circumference, and said arcuate section extending entirely in said circumference.

* * * * *